INVENTOR.
LARRY L. CRUZEN.
BY
Harry R. Dumont
ATTORNEY.

March 17, 1964 L. L. CRUZEN 3,125,337
STACK HEIGHT CONTROL APPARATUS FOR A SHEET FEEDER
Filed Dec. 14, 1960 3 Sheets-Sheet 2

INVENTOR.
LARRY L. CRUZEN.
BY Harry R. Dumont
ATTORNEY.

March 17, 1964
L. L. CRUZEN
3,125,337
STACK HEIGHT CONTROL APPARATUS FOR A SHEET FEEDER
Filed Dec. 14, 1960
3 Sheets-Sheet 3
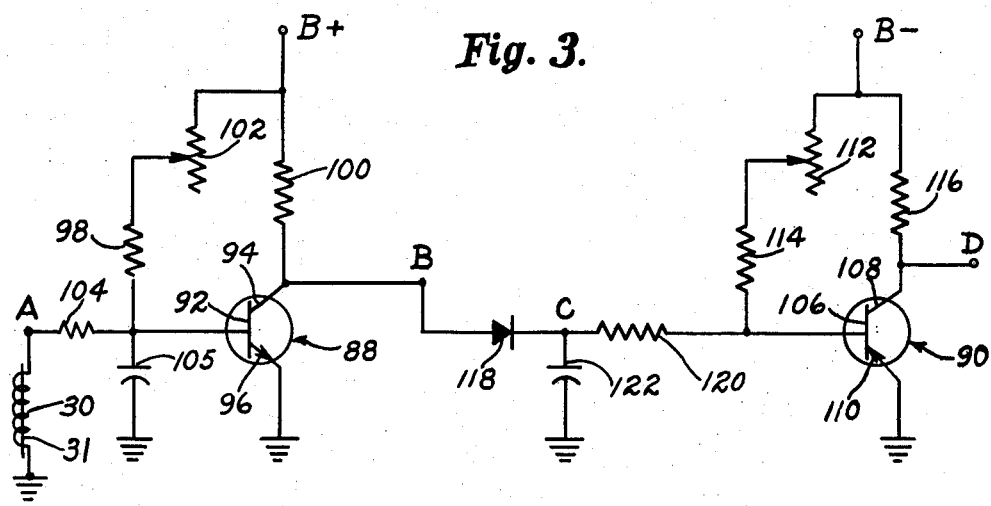
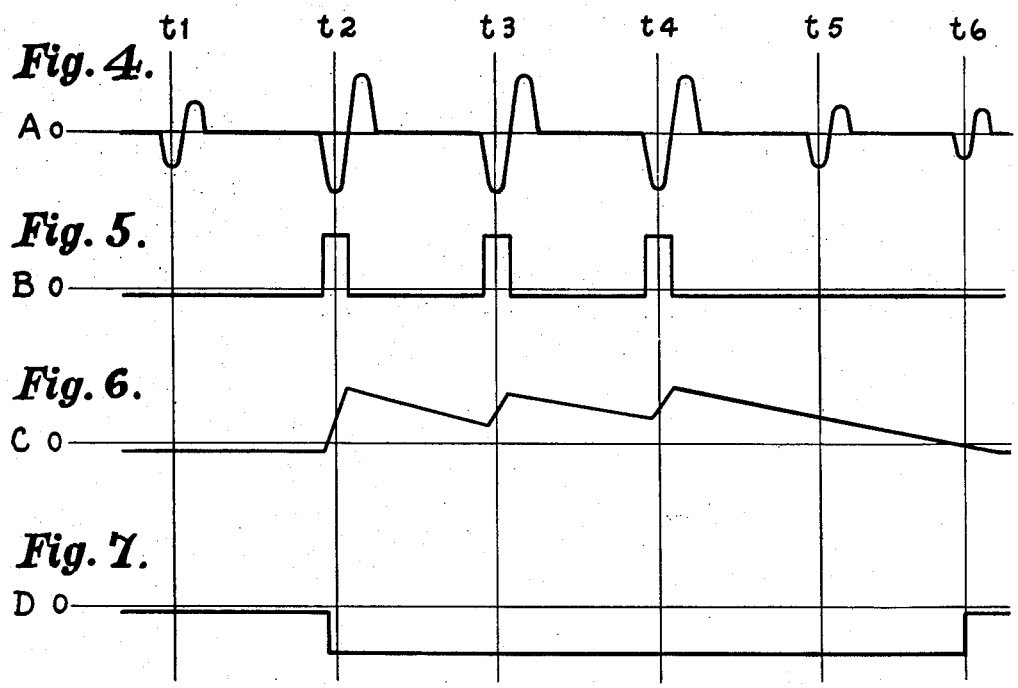
INVENTOR.
LARRY L. CRUZEN.
BY
Harry R. Dumont
ATTORNEY.

United States Patent Office 3,125,337
Patented Mar. 17, 1964

3,125,337
STACK HEIGHT CONTROL APPARATUS FOR A SHEET FEEDER
Larry L. Cruzen, Livonia, Mich., assignor to Burroughs Corporation, Detroit, Mich., a corporation of Michigan
Filed Dec. 14, 1960, Ser. No. 75,756
2 Claims. (Cl. 271—62)

This invention relates generally to a mechanism for sheet feeding from a stack and particularly to a stack height control apparatus therefor.

In sheet feeding mechanisms for feeding sheets singly from a stack, it is necessary to advance the stack to compensate for diminution of the stack by the feeder. Because of the relatively small dimensional change in stack height caused by removal of several sheets, particularly when these are of paper, the apparatus to control the height sensing and stack elevation must be highly sensitive. The control apparatus must also be capable of producing a linear output for a controlled time interval in response to a minute displacement of the stack height sensing member.

It is an object of my invention to provide stack height control apparatus for a sheet feeder wherein an inductive element is moved in a magnetic flux field relative to a moving magnetically permeable element and the variance of the voltage induced in the inductive element is utilized to electrically control the stack elevation mechanism.

It is an additional object of my invention to provide stack height control apparatus for a sheet feeder wherein a coil having a magnetic flux maintained therethrough is fixed to a stack sensor and moved longitudinally relative to the fixed path of a rotating member carrying a plurality of magnetically permeable elements whereby a voltage is induced inversely proportional to the displacement of the end of the coil from the fixed path, and a predetermined voltage output operates the stack elevating mechanism.

It is a further object of my invention to provide an electro-magnetic measuring apparatus including a magnetically permeable element movable in a fixed path and serving as a reference for displacement of an inductive element in a magnetic field.

It is a still further object of my invention to provide an electro-magnetic measuring apparatus including a rotating cylindrical member carrying a plurality of magnetically permeable elements operable to induce in a movable inductive member a pulsating D.C. voltage whose magnitude varies in accordance with the displacement of the inductive member from the rotating member.

In accordance with the foregoing objects, the invention, first briefly described, is embodied in a sheet feeder. An inductance is mounted on a sensing member, which depends on the sheet stack. A magnetic means is utilized to maintain a magnetic flux field through the inductive means. A magnetically permeable means is rotated through a fixed path proximate the inductance and serves to move the flux field through the inductance to induce a voltage therein. As the stack becomes depleted, the sensing member moves and changes the distance of the inductance from the magnetically permeable means. When the voltage reaches a predetermined magnitude, the inductance, which is operatively connected to the stack support, will initiate an upward movement of the stack.

The following detailed description and the accompanying drawings disclose a preferred embodiment of the invention wherein:

FIG. 3 is a schematic drawing of the control circuit;

FIGS. 4 through 7 are graphs portraying voltage characteristics at points A, B, C and D respectively in the control circuit of FIG. 3.

Figure 1:
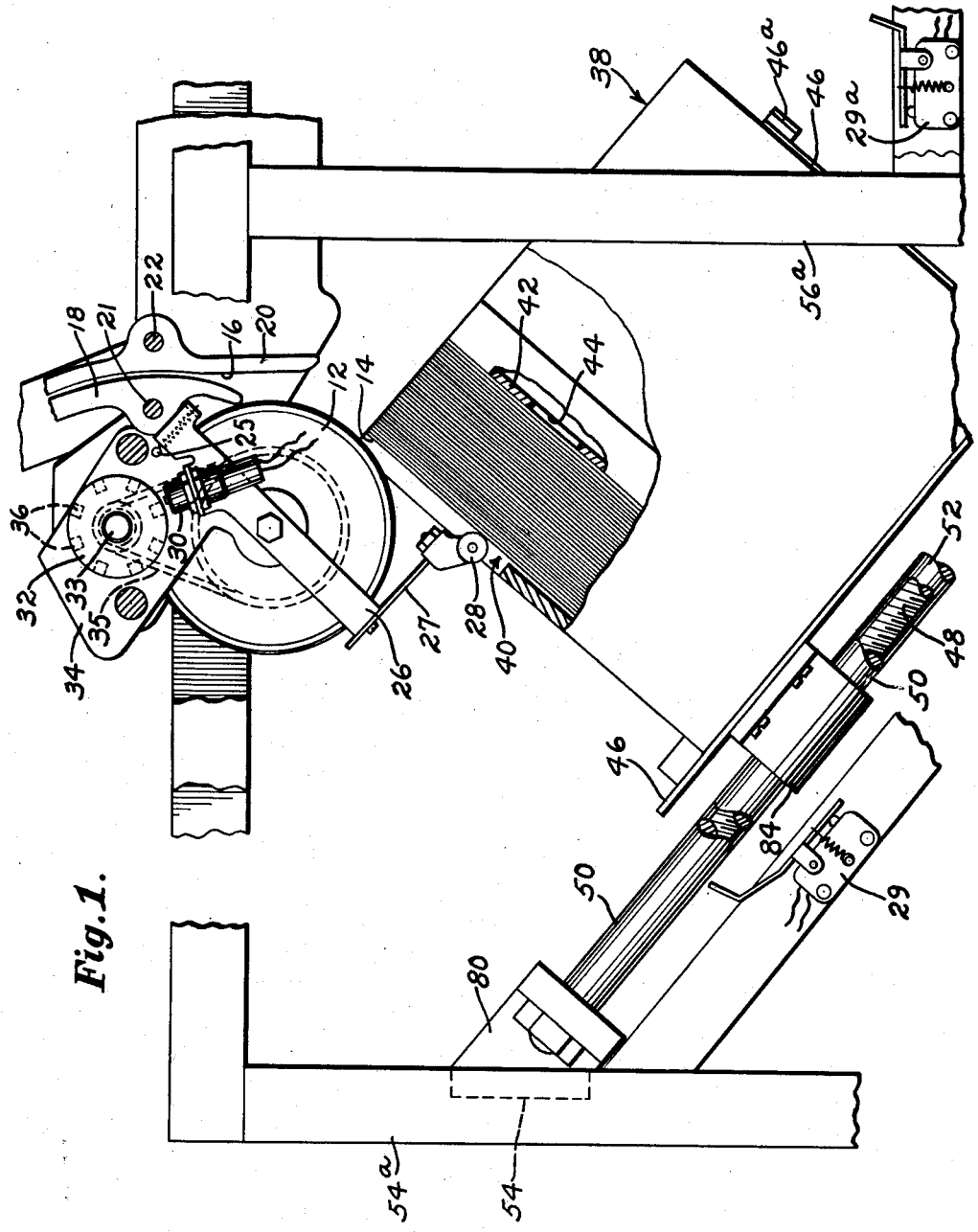
FIGURE 1 is an elevation of the sheet feeding mechanism with parts broken away.

Shown in FIG. 1 is the sheet feeding mechanism, which provides a vacuum feed wheel of a well known type aligned at the receiving throat of a sheet transport system adapted to feed a sheet from a stack in a magazine. The sheet feeding mechanism is substantially similar to that described in U.S. application 838,501, "Magazine for Holding Sheets," filed in behalf of John G. Smith on September 8, 1959 and of common ownership herewith. The height sensing apparatus is associated with a sensing member depending on the top of the stack. Vacuum wheel 12 is coupled to a vacuum source, not shown, which, on demand, effects and concentrates a vacuum force at the lower periphery of the wheel to remove the uppermost sheet from the stack of sheets 14 and, during the rotation counterclockwise of the wheel, directs the sheet into the throat 16 between guide rails 18 and 20 of the sheet transport system. Guide rails 18 and 20 extend longitudinally of the subsequent path of travel of the sheets, are supported on transverse shafts 21 and 22, and are adjustable relative to the width of sheets being fed.

The stack height sensing apparatus includes a sensing member, an inductive means and a movable carrier or cylinder. The sensing member 26 is pivotally mounted proximate its center coaxially with vacuum wheel 12 and has a downward projecting extension 27 at one end carrying a roller 28, which depends on the top of the sheet stack. A stud 25 extends outwardly from mounting plate 34 to provide an upper limit for the pivotal movement of sensing member 26. The inductive means, herein embodied as a coil 30, is also shown by a schematic representation in connection with the circuit in FIG. 3. Coil 30 has a bar-type permanent magnet 31 mounted along its axis to provide a flux fixed about the coil. A rotatable carrier or cylinder 32 is formed of a magnetically non-permeable material, which may be a non-ferrous metal such as bronze. The cylinder is mounted on a shaft 33 projecting outwardly through mounting plate 34. Cylinder 32 receives a rotative drive through shaft 33, which is coupled by a belt 35 to provide a drive for the vacuum wheel 12. Cylinder 32 rotates in a counterclockwise direction and at constant speed during the feeding operation. Mounted about the periphery of the cylinder 32 are a plurality of equally spaced magnetically permeable elements 36. In the present embodiment of the invention, the elements 36 are iron slugs.

Also shown in FIG. 1 is a stack magazine and a portion of the stack advancing mechanism, both of which are fully described in the aforementioned Smith application. The magazine 38 has an opening 40 at its upper and forward end to admit the sensing roller 28 and vacuum wheel 12. Also included is a movable partition 42 behind the stack of sheets. The partition 42 has an aperture 44 in alignment with sensing roller 28. Magazine support 46 is adapted to carry the sheet magazine and has provided for its advance an elevating screw 48. A pair of spaced shafts 50 and 52 are provided as guideways for movement of the support 46 as will be more clearly shown in connection with FIG. 2. An upper limit switch 29 is provided on an adjacent side frame of the machine. A lower limit switch 29a is provided cooperable with a switch actuating lug 46a extending laterally from support 46.

Figure 2:
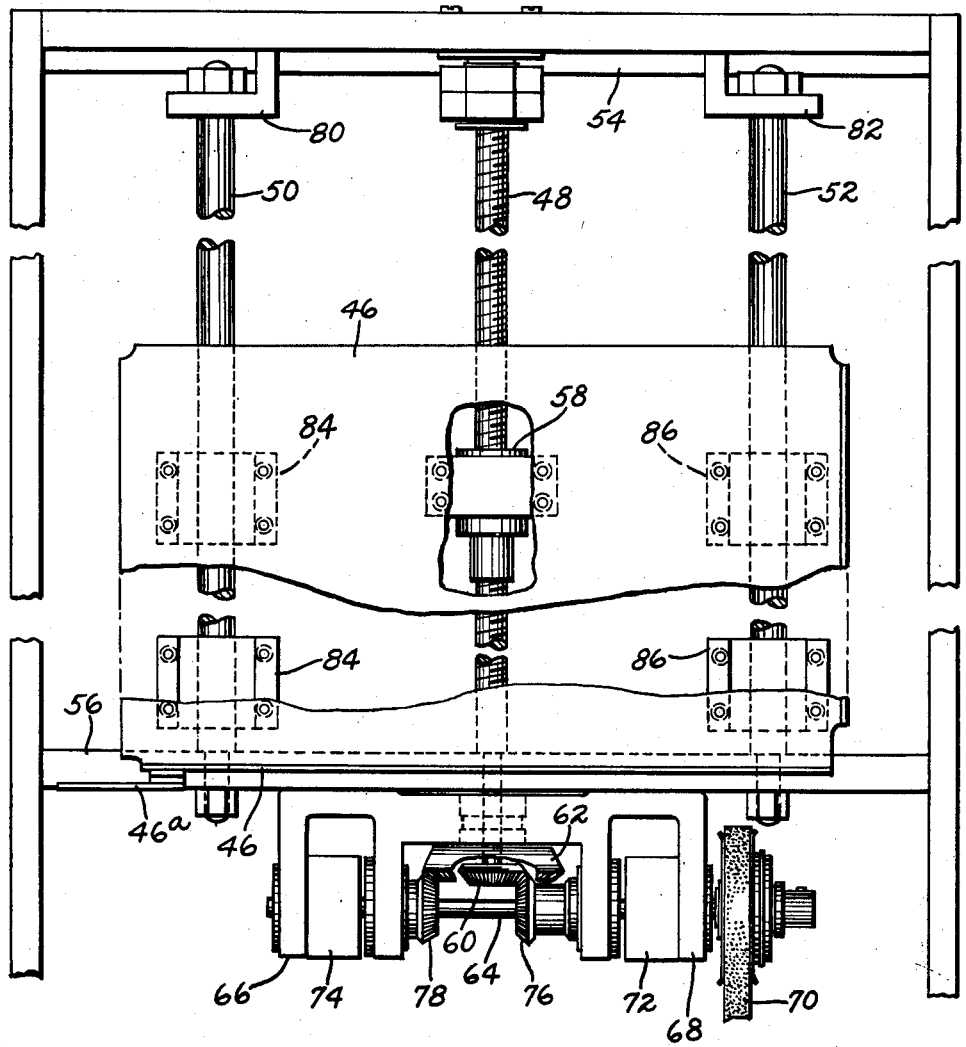
FIG. 2 is a plan view of the sheet support elevating mechanism.

FIG. 2 shows the mechanism by which the support 46 is advanced and returned along an inclined path during sheet feeding operation. Elevating screw 48 is journalled for rotation at its ends in cross members 54 and 56. Cross members 54 and 56 are supported by vertical support members 54a and 56a, respectively, as also shown in FIG. 1. Fixed to the underside of support 46 is a nut 58 threadably engaging elevating screw 48. The rotation of elevating screw 48 in nut 58 serves to translate the rotative movement of the screw into a linear movement of the support. Elevating screw 48 has fixed to its lower end a pair of coaxial bevel gears 60 and 62. The drive mechanism includes a drive shaft 64 journalled at its ends in bearings 66 and 68 and receiving a continuous drive from belt 70 coupled to a drive motor, not shown. Also provided are an up clutch 74 and a down clutch 72, which are of a well known electromagnetic construction. Drive gears 76 and 78 mesh with bevel gears 60 and 62 respectively. Engagement of clutch 74 by its respective actuating solenoid will rotate drive gear 78 in a clockwise direction to elevate support 46, whereas engagement of clutch 72 by its respective actuating solenoid will rotate drive gear 76 in a clockwise direction to lower support 46. As is clearly apparent from the gear tooth ratios of gears 60 and 62, the drive mechanism will raise the support 46 at a rate faster than it will be lowered in a ratio of approximately two to one. A complete and detailed description of the elevating and return mechanism is contained in the aforementioned Smith application.

FIG. 2 also shows additional detail of the guide structure for support 46. Shafts 50 and 52 are fixed at their one end to cross member 54 by brackets 80 and 82, respectively and fixed at their other end to cross member 56. Support 46 has a pair of bearing blocks 84 fixed to its underside and slidably engaging shaft 50. A second pair of bearing blocks 86 are likewise fixed to the underside of support 46 and slidably engage shaft 52.

FIG. 3 shows a schematic of the control circuit, which has its output at terminal D coupled to the actuating solenoid driver, which controls the engagement of up clutch 74 to elevate support 46. The control circuit has the function of providing a linear output to activate the up clutch whenever the stack has become depleted by sheet feeding to a point where pivotal movement of sensing member 26 has advanced the coil 30 to a predetermined distance from the reference periphery of cylinder 32. The control circuit has as its basic components an inductance or coil 30, a forward biased transistor 88, and a forward biased transistor 90. Transistor 88 has a base electrode 92, a collector electrode 94, and grounded emitter electrode 96. A voltage divider network is provided for transistor 88, which is connected to a source of B+ potential and includes resistors 98 and 104 and variable resistor 102. Resistor 98 is coupled to base 92 of transistor 88 and resistor 100 is coupled to collector 94. Coil 30 is coupled to base 92 through resistor 104 and to ground and has a permanent magnet 31 mounted coaxially therein. Capacitor 105 is connected between the input lead to transistor 88 and ground. Transistor 90 has a base electrode 106, a collector electrode 108 and a grounded emitter electrode 110. A voltage divider network is provided for transistor 90 and is connected to a source of B— potential. The voltage divider includes variable resistor 112 and resistors 114 and 120. The output from collector 94 of transistor 88 is coupled to base 106 of transistor 90. Connected in series therebetween is diode 118. A capacitor 122 has one terminal connected between diode 118 and resistor 120 and the other terminal connected to ground.

FIG. 4 shows a pulsating voltage output from coil 30 of varying amplitude at point A.

FIG. 5 shows the voltage output from transistor 88 at point B.

FIG. 6 shows the voltage charge on capacitor 122 at point C.

FIG. 7 shows the voltage output from transistor 90 at terminal D. It will be noted that the voltage output from point D is utilized to actuate the control solenoid driver for up clutch 74 of FIG. 2 to control the upward movement of support 46.

Description of Operation

To commence a feeding operation, a sheet filled magazine 38 is loaded on support 46. If the stack of sheets in the magazine is at the feed level of vacuum wheel 12, individual sheets will be advanced, one at a time, by the wheel into throat 16 of the transport system. Cylinder 32 receives a counter clockwise rotation from shaft 33. The periphery of cylinder 32, therefore, carries the plurality of magnetically permeable elements through a fixed path near the end of coil 30. As indicated in FIG. 3, the coil has a bar magnet 31 located coaxially therein so that a flux field is established through the coil. The coil 30 is positioned on sensing member 26 so that each time an iron slug 36 approaches the adjacent end of the coil, the flux is moved upwardly and longitudinally of the axis of the coil. As the iron slug begins to leave the position proximate the end of the coil, the flux lines drop back down along the axis of the coil. A voltage of a pulsating waveform is therefore induced in the coil as shown in FIG. 4. The pulse repetition rate is dependent upon the number of iron slugs carried by the cylinder 32 and the angular velocity of shaft 33. As the stack of sheets is diminished in height, sensing arm 26, which depends on the top of the stack, pivots counterclockwise about its center. This advances the upper end of coil 30 closer to the periphery of cylinder 32 and therefore increases the amplitude and magnitude of the voltage induced in the coil. When the voltage reaches a predetermined level, which is indicative of the distance of the coil end from the periphery of cylinder 32, the control circuit shown in FIG. 3 will produce a voltage output to a solenoid driver, which controls up clutch 74 as shown in FIG. 2. The support 46 will therefore elevate the stack until the pivotal movement of sensing member 26 displaces the end of coil 30 from the periphery of cylinder 32 sufficiently that the voltage drops below a magnitude sufficient to activate the control circuit.

The sheet feeding process will continue as indicated above until the last sheet from the pile has been fed. At this time, roller 28 of sensing member 26 will drop through the aperture 44 in magazine partition 42. This will advance coil 30 to the uppermost limit of stud 25 so that it will furnish a voltage of sufficient magnitude to provide a further upward movement of support 46. Upper limit switch 29 will have its actuating arm depressed by the upward movement of bearing block 84. Actuation of switch 29 will de-energize the up clutch 74 and energize the down clutch 72. The support 46 will then be lowered until lug 46a makes lower limit switch 29a and stops the elevating apparatus preparatory for the loading of another magazine.

The purpose of the control circuit of FIG. 3 is to respond to a predetermined voltage output from coil 30 and produce a substantially linear voltage output for the up clutch solenoid driver. The circuit is of the type commonly referred to as a resettable delay flop. When the sheets in magazine 38 are at the required feed level, the coil has a relatively low voltage output as shown at $t_1$ in FIG. 4. The voltage is insufficient to overcome the slightly positive voltage of +.1 volt of the base 92 of transistor 88. Thus, at $t_1$, transistors 88 and 90 are in a conductive state. When the sheets in magazine 38 drop below the required feed level, the voltage output from coil 30 reaches a level of —1.5 volts sufficient to overcome the bias furnished to base 92 through resistors 102 and 98 and cut off transistor 88. It will be noted that variable resistor 102 may be varied to alter the sensitivity of transistor 88 to changes in voltage from coil 30. The function of capacitor 105 is to filter out noise.

At $t_2$, when transistor 88 has ceased to conduct, a +6 voltage will be applied to capacitor 122 through resistor 100. As capacitor 122 charges toward a value of approximately +5.5 volts, it will overcome the previously negative bias on the base 106 of transistor 90 through its voltage divider network through resistors 112, 114 and 120. The output of transistor 90 will then drop from −.1 volt to −18 volts, which will energize the solenoid for up clutch 74. The support 46 will therefore be elevated.

Between times $t_2$ and $t_3$, the output voltage from coil 30 goes to a positive 1.5 volts. This voltage re-energizes transistor 88 as shown in FIG. 5 and the voltage drop is blocked by diode 118. The charge path for capacitor 122 is through resistor 100 and diode 118. The discharge path for capacitor 122 is primarily through resistors 120, 114 and 112. The RC discharge time constant for capacitor 122 is greater than the time interval between $t_2$ and $t_3$. Therefore, at times $t_3$ and $t_4$, transistor 90 continues to furnish a negative voltage output of approximately −18 volts to keep the solenoid driver for up clutch 74 energized and to continue the elevation of support 46.

When the magazine has advanced the stack of sheets to the proper feed level, the pivotal movement of sensing member 26 will displace coil 30 from the periphery of cylinder 32. The voltage output from the coil will not reach the −1.5 volts to extinguish transistor 88. Therefore, at time $t_5$ transistor 88 will remain in a conductive or energized state. The voltage at point B will drop to a minus .1 volt. Capacitor 122 cannot discharge through transistor 88 because of diode 118 and will then discharge through resistors 120, 114 and 112 to resume its original −.4 volt charge. The voltage on the base 106 of transistor 90 will be biased sufficiently negative to return transistor 90 to its original conductive state. The circuit will be returned to its original quiescent state with both transistors 88 and 90 in a conductive state as shown at $t_6$ in FIGS. 5 and 7.

In the circuit of FIG. 3 in an exemplary embodiment of the present invention, the B plus voltage supply is 6 volts; the B minus voltage supply is 18 volts; capacitor 104 and 122 have values of about 0.02 μfd. and 10 μfd; resistors 98, 100, 102 and 104 have values of about 2,400 ohms, 270 ohms, 5,000 ohms, and 330 ohms, respectively; resistors 112, 114, 116 and 120 have values of about 100,000 ohms, 20,000 ohms, 6,200 ohms, and 20,000 ohms respectively.

What is claimed is:

1. A variable amplitude voltage generating device for measuring the diminution of a stack of documents being individually fed by a document feeder, said device comprising a rotatable cylinder of magnetically impermeable material, a plurality of magnetically permeable elements carried by and spaced apart circumferentially of said cylinder in magnetically separated relation from each other, said elements being mounted at a common inner radius and terminating at the outer cylindrical surface of said cylinder, a sensing member mechanically displaceable by the stack of documents, a permanent bar magnet mounted on said sensing member for movement therewith in a direction intercepting the path of rotation of said cylinder with one end of the magnet spaced from and facing the cylindrical surface of the cylinder, and an induction coil surrounding said bar magnet to induce pulses of increasing voltage amplitude therein as the bar magnet approaches the cylinder.

2. In combination, a rotatable cylindrical member of magnetically impermeable material, a plurality of magnetically permeable elements spaced circumferentially apart and carried by said cylindrical member in magnetically separated relation from each other, said magnetically permeable elements being mouned at a common radius and terminating at the cylindrical surface of said cylindrical member, a mechanically displaceable sensing member having at least a portion thereof moveable in a direction intercepting the path of rotation of the cylinder, and a transducer head mounted on said portion of said sensing member for movement therewith in the aforesaid direction and including a flux generating permanent magnet having a pole portion spaced from and facing said magnetically permeable elements in said cylinder and a cooperating induction coil inducing an electrical signal therein varying in amplitude in accordance with the mechanical displacement of said sensing member and resulting from the disturbance of the flux generated by the permanent magnet with the passage of each of said magnetically permeable elements of the cylinder past the pole portion of the magnet.

References Cited in the file of this patent

UNITED STATES PATENTS

| | | |
|---|---|---|
| 415,877 | Mont Ross | Nov. 26, 1889 |
| 761,682 | Javaux et al. | June 27, 1904 |
| 1,153,076 | Heinze | Sept. 7, 1915 |
| 2,266,596 | Goodwin | Dec. 16, 1941 |
| 2,355,047 | Bennett | Aug. 8, 1944 |
| 2,372,229 | Sinkovitz | Mar. 27, 1945 |
| 2,553,629 | Behr | May 22, 1951 |
| 3,035,782 | Burbank | May 22, 1962 |